(12) United States Patent
Roesch et al.

(10) Patent No.: US 12,735,316 B2
(45) Date of Patent: Sep. 15, 2026

(54) STEAM METHANE REFORMING WITH PROCESS CARBON DIOXIDE CAPTURE AND AMMONIA FIRING

(71) Applicant: L'Air Liquide, Societe Anonyme pour l'Etude et l'Exploitation des Procedes Georges Claude, Paris (FR)

(72) Inventors: Alexander Roesch, Frankfurt am Main (DE); Richard Dubettier, Champigny-sur-Marne (FR); Dieter Ulber, Frankfurt am Main (DE); Florian Pontzen, Frankfurt am Main (DE); Guillaume Lodier, Jouy-en-Josas (FR); Michael Lutz, Frankfurt am Main (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 841 days.

(21) Appl. No.: 18/088,502

(22) Filed: Dec. 23, 2022

(65) Prior Publication Data

US 2023/0212006 A1 Jul. 6, 2023

Related U.S. Application Data

(60) Provisional application No. 63/295,514, filed on Dec. 31, 2021.

(51) Int. Cl.
*C01B 3/384* (2026.01)
*B01D 53/047* (2006.01)
(Continued)

(52) U.S. Cl.
CPC ............ *C01B 3/384* (2013.01); *B01D 53/047* (2013.01); *B01D 53/8631* (2013.01); *B01J 8/062* (2013.01);
(Continued)

(58) Field of Classification Search
CPC ...... B01J 8/062; B01J 8/065; B01J 2208/005; C01B 3/384; C01B 3/382; C01B 3/48;
(Continued)

(56) References Cited

U.S. PATENT DOCUMENTS 11,760,630 B2 * 9/2023 Foody .................... C10L 3/104 423/220
2010/0310949 A1 * 12/2010 Licht ...................... C01B 3/382 429/420

(Continued)

FOREIGN PATENT DOCUMENTS

WO 2019 120999 A1 6/2019

OTHER PUBLICATIONS

Osaka University, Taiyo Nippon Sansa, Nippon Steel for NG/ NH3, Ammonia combustion technology for reducing CO2 emission in industrial furnaces developed, https://resou.osaka-u.ac.jp/en/research/2017/20170626_2, last accessed Dec. 23, 2022.

(Continued)

*Primary Examiner* — Lessanework Seifu
(74) *Attorney, Agent, or Firm* — Justin K. Murray

(57) ABSTRACT

An apparatus for producing hydrogen in a steam methane reformer with reduced carbon emissions, the apparatus comprising: a first heat exchanger configured to heat a feed stream comprising methane to produce a heated feed stream that is at a temperature above 500° C.; a reaction zone in fluid communication with the first heat exchanger, wherein the reaction zone is configured to receive the heated feed stream under conditions effective for catalytically cracking the heated feed stream and catalytically crack the heated feed stream to produce a reformed stream, wherein the reformed stream comprises hydrogen, carbon monoxide, and unreacted methane; a shift conversion unit in fluid communication with the reaction zone, wherein the shift (Continued)

conversion unit is configured to receive the reformed stream in the presence of steam and produce a shifted gas stream comprising hydrogen and carbon dioxide; and a hydrogen purification unit configured to receive the shifted gas stream and purify the shifted gas stream to produce a hydrogen product stream and a tail gas; wherein the conditions effective for catalytically cracking the heated feed stream comprise providing heat to the reaction zone via combustion of a fuel and a hydrogen fuel stream in presence of an oxidizer, wherein the fuel comprises ammonia, wherein a flue gas is produced by the combustion of the fuel and the hydrogen fuel stream.

11 Claims, 4 Drawing Sheets

(51) Int. Cl.

| | |
|---|---|
| ***B01D 53/86*** | (2006.01) |
| ***B01J 8/06*** | (2006.01) |
| ***C01B 3/382*** | (2026.01) |
| ***C01B 3/48*** | (2006.01) |
| ***C01B 3/56*** | (2006.01) |

(52) U.S. Cl.

CPC ................ *C01B 3/382* (2013.01); *C01B 3/48* (2013.01); *C01B 3/56* (2013.01); *B01D 2257/504* (2013.01); *B01J 2208/00504* (2013.01); *B01J 2208/065* (2013.01); *C01B 2203/0233* (2013.01); *C01B 2203/025* (2013.01); *C01B 2203/0283* (2013.01); *C01B 2203/042* (2013.01); *C01B 2203/0475* (2013.01); *C01B 2203/0811* (2013.01); *C01B 2203/1241* (2013.01); *C01B 2210/0006* (2013.01); *C01B 2210/0051* (2013.01); *C01B 2210/0075* (2013.01)

(58) Field of Classification Search

CPC .............. C01B 3/56; C01B 2203/0233; C01B 2203/0283; C01B 2203/0475; C01B 2203/0811; C01B 2203/0816; C01B 2203/0822; B01D 53/047; B01D 53/8631; B01D 2257/504; B01D 2251/2062; B01D 53/8625

See application file for complete search history.

(56) References Cited

U.S. PATENT DOCUMENTS

| | | | | |
|---|---|---|---|---|
| 2021/0163286 | A1* | 6/2021 | Ostuni | C01B 3/025 |
| 2022/0306465 | A1* | 9/2022 | Arora | C01B 3/382 |

OTHER PUBLICATIONS

International Search Report and Written Opinion for corresponding PCT/US2022/054001, Jul. 20, 2023.

* cited by examiner 1
2
3
4
5
6
7a
8a
8b
10
11
13
13a
13b
14
15a
15b
50
51
52
53
54
55
57
58
59

STEAM METHANE REFORMING WITH PROCESS CARBON DIOXIDE CAPTURE AND AMMONIA FIRING

CROSS REFERENCE TO RELATED APPLICATIONS

This application claims priority to U.S. Provisional Application Ser. No. 63/295,514 filed on Dec. 31, 2021, which is hereby incorporated by reference in its entirety.

TECHNICAL FIELD OF THE INVENTION

The present invention relates to an apparatus and method for hydrogen production using existing industrial units. More specifically, embodiments of the present invention are related to reducing the carbon footprint of a reforming unit via carbon capture and a reduction in produced carbons.

BACKGROUND OF THE INVENTION

In an effort to provide green energy, reducing carbon footprints of industrial units is becoming increasingly important. Moreover, as hydrogen is quickly becoming the preferred energy carrier of the future due to being carbon-free, production of hydrogen in an environmentally sensitive manner is becoming increasingly more important.

Steam methane reforming (SMR) is one such industrial unit that is currently in use to produce hydrogen. In a typical SMR, methane and steam are combined and reacted at high temperatures to produce syngas (i.e., a mixture predominantly made up of hydrogen, carbon monoxide, and carbon dioxide). This reaction is endothermic, and therefore, requires added heat for the reaction to proceed, which is supplied by burning a fuel (typically a portion of the methane feedstock) in the presence of oxygen to produce a flue gas consisting essentially of carbon dioxide, water, and unreacted oxygen. If air is used to provide the oxygen, then the flue gas will also contain nitrogen and nitrogen oxides (NOx). The syngas is typically upgraded using a water-gas-shift to convert the carbon monoxide into carbon dioxide and additional hydrogen. Finally, the syngas is sent to a purifier (typically a pressure swing adsorber ("PSA")), to produce a pure hydrogen stream and a PSA tail gas stream, which consists primarily of carbon dioxide, some hydrogen, and unreacted methane. The PSA tail gas stream is then used as fuel, recycled and combined with the process natural gas for reforming, or recycled to the inlet of the PSA unit.

Unfortunately, current steam reformer plants for $H_2$ production do not have any $CO_2$ capture installed. Thus all the $CO_2$ is emitted to the atmosphere.

For existing SMRs, there are three primary locations for capturing the $CO_2$:

#1 location: $CO_2$ capture in the syngas, preferably downstream the CO Shift;

#2 location: $CO_2$ capture in the PSA tail gas; or

#3 location: $CO_2$ capture in the flue gas

Option #1 or #2 can also be combined with option #3 in order to reach an even higher capture rate. It shall be noted that without a $CO_2$ capture unit, all the $CO_2$, either from the process or the combustion will be emitted at the stack.

As an alternative to $CO_2$ capture, it is also possible to use a decarbonized feedstock such as ammonia ("$NH_3$") By using $NH_3$ as the feed stream instead of $CH_4$, the source of carbon on the process side is eliminated. However, there are no suitable $H_2$ production processes available on the market and a production of $H_2$ based on $NH_3$ would be extremely expensive today.

The problem with the current state of the art solutions is that a high $CO_2$ capture rate of more than 90% in a SMR plant can only be obtained by a flue gas capture unit. However, this solution is not currently economically feasible, since the capture cost of $CO_2$ from flue gas is significantly higher than the capture cost from process related $CO_2$ (Syngas or PSA tail gas) by typically 30%.

A solution must be found to overcome the burden of having a Process Capture Unit installed and then further decarbonize the hydrogen production, including reducing the carbon within the flue gas.

SUMMARY OF THE INVENTION

The present invention is directed to an apparatus and process that satisfies at least one of these needs. In certain embodiments, the invention may include installation of a more economic process $CO_2$ capture unit first and then to replace the $CO_2$ emission caused by the combustion of remaining hydrocarbons by means of a hydrocarbon free fuel gas (e.g., $NH_3$), such that the flue gas, which is the main $CO_2$ contributor of the process, has a significantly reduced amount of $CO_2$ as compared to a flue gas produced by combustion of $CH_4$.

In certain embodiments, the task is to reach a high capture rate above 95% up to 99-100% without using a $CO_2$ capture unit on the flue gas, which is costly in terms of both CAPEX & OPEX. This can be achieved by using ammonia as a fuel. Furthermore, as ammonia has different combustion characteristics as compared to methane, slight modifications to the existing hydrogen production facilities burner and firing system can be made in order to increase the ammonia fuel content, or more preferably, fully replace the hydrocarbon fuel with ammonia fuel.

Pure $NH_3$ combustion is challenging due to the slow kinetics of the combustion reaction (only 20% of the laminar burning velocity of methane), therefore many concepts mentioned in literature are based on co-combustion of natural gas and ammonia (See, e.g., Osaka University, Taiyo Nippon Sansa, Nippon Steel for NG/$NH_3$, https://resou.osaka-u.ac.jp/en/research/2017/20170626_2, last accessed Oct. 20, 2021. However, use of natural gas with the ammonia still results in an unwanted amount of carbon dioxide production within the flue gas.

Hydrogen improves the combustion features of ammonia. Therefore, in certain embodiments of the present invention, ammonia can be combined with off gases containing hydrogen from the proposed SMR scheme. This leads to beneficial combustion properties compared to pure usage of $NH_3$. The mixture of off gas with $NH_3$ allows the use of standard burner designs and prevents excessive NOx formation. With a $H_2$ content of 10-50% vol, more preferably 10-30%, a smooth combustion of $NH_3$/air can be achieved, as stable as classical methane/air mixture. In certain embodiments, an indicator may be used to quantify the combustion stability. For example, the extinction stretch rate can evaluate the capability of the flame to stay ignited when stretched by turbulent vortices. The higher it is, the stronger the flame and the more stable the combustion. This indicator can be readily computed from dedicated software known to those of ordinary skill in the art.

In one embodiment, a method for producing hydrogen in a steam methane reformer with reduced carbon emissions is provided. In this embodiment, the method can include the steps of: heating a feed stream comprising methane in a first heat exchanger to produce a heated feed stream, wherein the heated feed stream is at a temperature above 500° C.; introducing the heated feed stream into a reaction zone under conditions effective for catalytic conversion of the heated feed stream to produce a reformed stream, wherein the reformed stream comprises hydrogen, carbon monoxide, and unreacted methane; introducing the reformed stream in the presence of steam to a shift conversion unit that is configured to produce a shifted gas stream comprising hydrogen and carbon dioxide; and purifying the shifted gas stream to produce a hydrogen product stream and a tail gas; wherein the conditions effective for catalytic conversion of the heated feed stream comprise providing heat to the reaction zone via combustion of a fuel and a hydrogen fuel stream in presence of an oxidizer, wherein the fuel comprises ammonia, wherein a flue gas is produced by the combustion of the fuel and the hydrogen fuel stream.

In optional embodiments of the method for producing hydrogen in an SMR:

- the hydrogen fuel stream and the fuel have a combined molar flow rate, wherein a molar flow rate of the hydrogen combined to the combined molar flow rate is between 0.05 and 0.4, preferably between 0.1 and 0.25;
- the hydrogen fuel stream is combusted in an amount that is effective for providing stable combustion behavior;
- the method can include the step of removing carbon dioxide from a stream selected from the group consisting of a first stream, a second stream, and combinations thereof, wherein the first stream is the shifted gas stream prior to purification in a hydrogen purification unit, wherein the second stream is the tail gas;
- the hydrogen fuel stream comprises at least a first portion of the tail gas;
- a second portion of the tail gas is fed to the reaction zone;
- the oxidizer is oxygen-enriched combustion air;
- the fuel and the hydrogen fuel stream are fed to a common burner system;
- the fuel and the hydrogen fuel stream are fed to separate burner systems;
- the method can include the step of vaporizing liquid ammonia in an ammonia vaporizer to produce gaseous ammonia, wherein ammonia in the fuel comprises the gaseous ammonia from the ammonia vaporizer;
- the method can include the step of removing NOx from the flue gas using a selective catalytic reduction unit;
- the method can include the step of controlling an amount of unreacted ammonia in the flue gas;
- the fuel has an ammonia content greater than 50%; and/or
- the fuel comprising ammonia is preheated to a temperature above 300° C.

In another embodiment, a method for producing hydrogen in a steam methane reformer with reduced carbon emissions can include a first mode of operation and a second mode of operation, wherein during both modes of operation, the method comprises the steps of: heating a feed stream comprising methane in a first heat exchanger to produce a heated feed stream, wherein the heated feed stream is at a temperature above 500° C.; introducing the heated feed stream into a reaction zone under conditions effective for catalytically cracking the heated feed stream to produce reformed stream, wherein the reformed stream comprises hydrogen, carbon monoxide, and unreacted methane; introducing the reformed stream in the presence of steam to a shift conversion unit that is configured to produce a shifted gas stream comprising hydrogen and carbon dioxide; purifying the shifted gas stream to produce a hydrogen product stream and a tail gas; and removing carbon dioxide from a stream selected from the group consisting of a first stream, a second stream, and combinations thereof, wherein the first stream is the shifted gas stream, wherein the second stream is the tail gas, wherein the conditions effective for catalytically cracking the heated feed stream comprise providing heat to the reaction zone via combustion of a fuel and a hydrogen fuel stream in the presence of an oxidizer, wherein the hydrogen fuel stream comprises at least a first portion of the tail gas, wherein a flue gas is produced by the combustion of the fuel and the hydrogen fuel stream, wherein during the first mode of operation, the fuel comprises a hydrocarbon, wherein during the second mode of operation, the fuel comprises ammonia, wherein the flue gas produced by the second mode of operation comprises less carbon dioxide than the flue gas produced by the first mode of operation.

In another embodiment, the method for producing hydrogen in a steam methane reformer can include the steps of: heating a feed stream comprising methane in a first heat exchanger to produce a heated feed stream, wherein the heated feed stream is at a temperature above 500° C.; introducing the heated feed stream into a reaction zone under conditions effective for catalytically cracking the heated feed stream to produce a reformed stream and a flue gas stream, wherein the reformed stream comprises hydrogen, carbon monoxide, and unreacted methane; introducing the reformed stream in the presence of steam to a shift conversion unit that is configured to produce a shifted gas stream comprising hydrogen and carbon dioxide; purifying the shifted gas stream to produce a hydrogen product stream and a tail gas; capturing $CO_2$ from the shifted gas stream or from the tail gas stream; storing liquid ammonia in a single storage vessel; vaporizing the liquid ammonia to create a gaseous ammonia stream; and using at least a portion of the gaseous ammonia as reformer fuel and using at least a portion of the gaseous ammonia as reactant for the reduction of NOx of the flue gas stream.

In another embodiment, an apparatus for producing hydrogen in a steam methane reformer with reduced carbon emissions is provided. The apparatus may include: a first heat exchanger configured to heat a feed stream comprising methane to produce a heated feed stream that is at a temperature above 500° C.; a reaction zone in fluid communication with the first heat exchanger, wherein the reaction zone is configured to receive the heated feed stream under conditions effective for catalytically cracking the heated feed stream and catalytically crack the heated feed stream to produce a reformed stream, wherein the reformed stream comprises hydrogen, carbon monoxide, and unreacted methane; a shift conversion unit in fluid communication with the reaction zone, wherein the shift conversion unit is configured to receive the reformed stream in the presence of steam and produce a shifted gas stream comprising hydrogen and carbon dioxide; and a hydrogen purification unit configured to receive the shifted gas stream and purify the shifted gas stream to produce a hydrogen product stream and a tail gas; an ammonia source; wherein the conditions effective for catalytically cracking the heated feed stream comprise providing heat to the reaction zone via combustion of a fuel and a hydrogen fuel stream in presence of an oxidizer, wherein the fuel comprises ammonia from the ammonia source, wherein a flue gas is produced by the combustion of the fuel and the hydrogen fuel stream.

In optional embodiments of the apparatus for producing hydrogen in an SMR:

- the hydrogen fuel stream and the fuel have a combined molar flow rate, wherein a molar flow rate of the hydrogen combined to the combined molar flow rate is between 0.05 and 0.4, preferably between 0.1 and 0.25, more preferably about 0.20;

the hydrogen fuel stream is combusted in an amount that is effective for providing a stable combustion behavior;

the apparatus can also include a carbon dioxide removal unit that is configured to remove carbon dioxide from a stream selected from the group consisting of a first stream, a second stream, and combinations thereof, wherein the first stream is the shifted gas stream prior to purification, wherein the second stream is the tail gas;

the hydrogen fuel stream comprises at least a first portion of the tail gas;

a conduit is in fluid communication with the carbon dioxide removal unit and the reaction zone, such that the conduit is configured to send a second portion of the tail gas to the reaction zone;

the oxidizer is oxygen-enriched combustion air;

the fuel and the hydrogen fuel stream are fed to a common burner system;

the fuel and the hydrogen fuel stream are fed to separate burner systems;

the apparatus can also include an ammonia vaporizer configured to vaporize liquid ammonia to produce gaseous ammonia, wherein ammonia in the fuel comprises the gaseous ammonia from the ammonia vaporizer; and/or the apparatus can also include a NOx removal unit that is configured to remove NOx from the flue gas using a selective catalytic reduction unit.

In yet another embodiment, an apparatus for producing hydrogen in a steam methane reformer with reduced carbon emissions is provided. In this embodiment, the apparatus can include: a first heat exchanger, a reaction zone, a shift conversion unit, a hydrogen purification unit, and a $CO_2$ removal unit, the apparatus being configured to operate in a first mode of operation and a second mode of operation.

In certain embodiments, during both modes of operation, the apparatus can be configured to: heat a feed stream comprising methane in the first heat exchanger to produce a heated feed stream, wherein the heated feed stream is at a temperature above 500° C.; introduce the heated feed stream into the reaction zone under conditions effective for catalytically cracking the heated feed stream to produce reformed stream, wherein the reformed stream comprises hydrogen, carbon monoxide, and unreacted methane; introducing the reformed stream in the presence of steam to the shift conversion unit that is configured to produce a shifted gas stream comprising hydrogen and carbon dioxide; purifying the shifted gas stream in the hydrogen purification unit to produce a hydrogen product stream and a tail gas; and removing carbon dioxide, using a $CO_2$ removal unit, from a stream selected from the group consisting of a first stream, a second stream, and combinations thereof, wherein the first stream is the shifted gas stream, wherein the second stream is the tail gas.

In certain embodiments, the conditions effective for catalytically cracking the heated feed stream can include the step of providing heat to the reaction zone via combustion of a fuel and a hydrogen fuel stream in the presence of an oxidizer, wherein the hydrogen fuel stream comprises at least a first portion of the tail gas, wherein a flue gas is produced by the combustion of the fuel and the hydrogen fuel stream.

In certain embodiments, during the first mode of operation, the fuel comprises a hydrocarbon, and during the second mode of operation, the apparatus is in fluid communication with an ammonia source such that the fuel comprises ammonia, and the flue gas produced by the second mode of operation comprises less carbon dioxide than the flue gas produced by the first mode of operation.

In an additional embodiment, the ammonia may be presplit by thermal decomposition over a catalyst at elevated temperature in order to further increase the content of hydrogen in the fuel and improve combustion performance. Ni or Ru being non-limiting examples of acceptable catalyst.

Ammonia is typically stored in liquid form (either cryogenic at −33° C. and ambient pressure, or at elevated pressure (~10 bar) at ambient temperature). Therefore, in order to ensure a reliable ammonia fuel supply, an ammonia fuel storage tank and ammonia fuel vaporizer can be included. In the case of the unlikely event gaseous ammonia will be available, the liquid ammonia system can be avoided.

In case of a phased installation approach, an ammonia fuel system can be installed completely independent to the hydrocarbon fuel and PSA tail gas fuel system.

BRIEF DESCRIPTION OF THE PRIOR ART DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In a preferred embodiment, the claimed process scheme includes a steam methane reformer, a CO-Shift conversion unit, a $H_2$ purification unit, a cryogenic $CO_2$ capture unit and the usage of hydrogen and/or ammonia or preferably a mixture of ammonia and hydrogen as make up fuel for the reformer.

Figure 1:
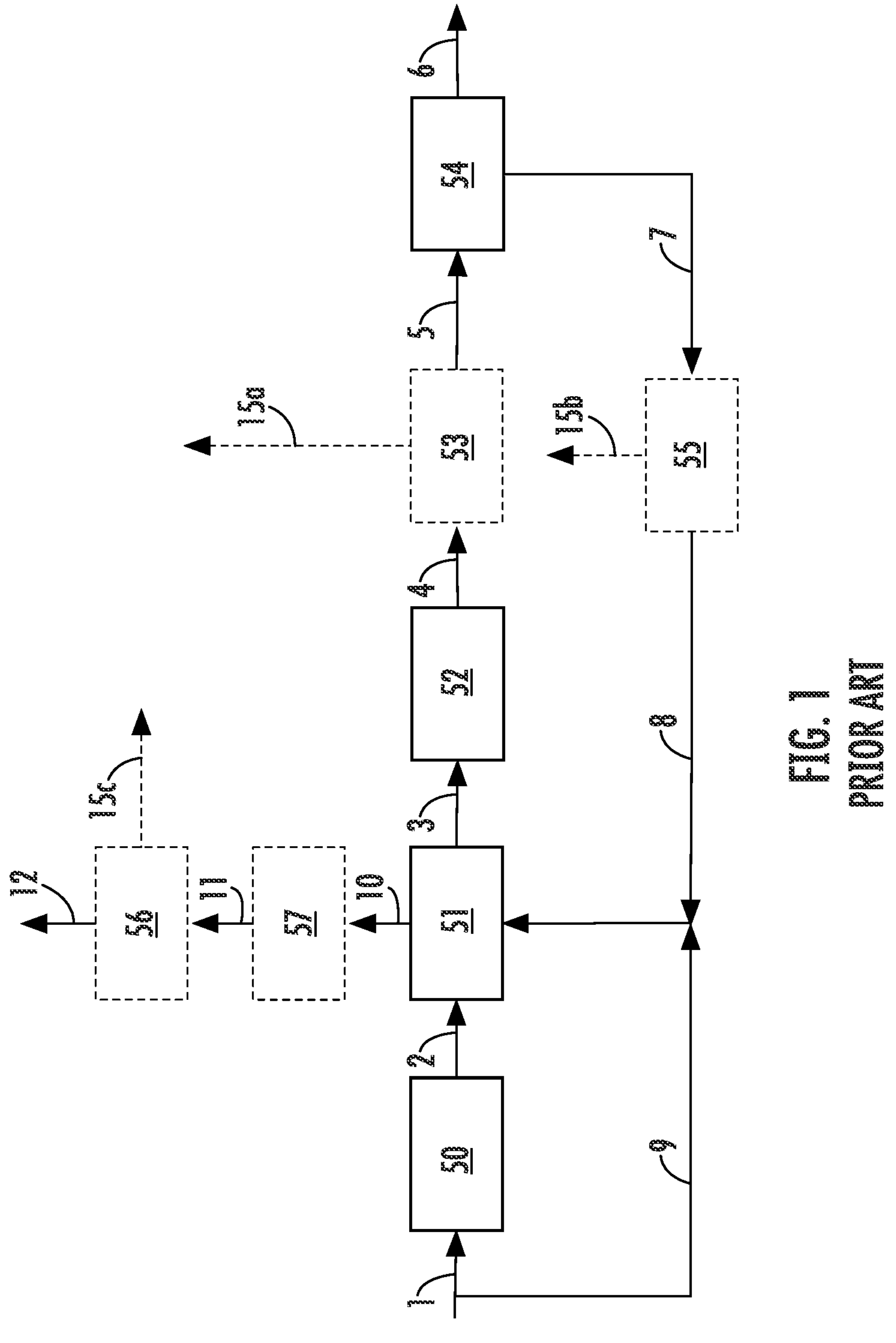
FIG. 1 shows a prior art embodiment of a hydrogen production facility in accordance where $CO_2$ is captured from the synthesis gas in a hydrogen production process.

FIG. 1 describes a typical hydrogen production process as known and considered as prior art. A hydrocarbon feedstock 1, typically natural gas, is used. In order to condition the feedstock to be processed by the steam methane reformer 51 certain feed pretreatment measures can occur and are summarized as pretreatment unit 50. These might include, but are not limited to, the removal of steam reforming catalyst poisons (e.g., sulphur, chloride, heavy metals). The feedstock might be heated and enriched with steam as required to achieve effective steam methane reforming process conditions. The pretreated steam reformer feedstock 2 is sent to the steam methane reformer 51 for generation of a hydrogen, $CO_2$ and CO containing syngas 3. In order to increase the hydrogen and $CO_2$ yield in the synthesis gas, a CO shift converter 52 is used. $CO_2$ product 15*a* can be separated from syngas by a $CO_2$ capture unit 53 using conventional physical or chemical solvent based technologies (e.g., amine wash or methanol wash technologies). The $H_2$ rich gas 5 after the $CO_2$ removal might be further purified by a dedicated $H_2$ purification unit 54 to increase the $H_2$ purity of the hydrogen product 6 as required.

Alternatively to a $CO_2$ capture in syngas, $CO_2$ might be captured from the PSA off gas 7 using a dedicated $CO_2$ separation unit 55. The remaining PSA offgas gas 8 might be used as fuel for the steam methane reformer 51. The heat demand of the steam reformer 51 is typically higher than the heat supplied by combusting the remaining PSA off gas 8. In order to close the heat balance of the steam reformer, a defined hydrocarbon stream is used as make-up fuel 9. During the combustion of the PSA offgas or hydrocarbon make up fuel, NOx might be formed, and a DeNOX unit 57 might be required to reduce the NOx values below environmentally allowable thresholds. In order to also capture $CO_2$ from the resulting DeNOX stream 11, a $CO_2$ capture unit 56 in the flue gas system might be installed to generate a $CO_2$ product stream 15*c* and a flue gas stream 10, 11, 12.

As mentioned above from a production cost perspective (considering operational expenditure and investment costs) the flue gas $CO_2$ capture unit (56) is the most expensive solution versus $CO_2$ capture from syngas 4 or PSA tail gas 7. This prior art process, while providing a high overall $CO_2$ capture rate, provides a costly flue gas $CO_2$ capture unit (56) that is just not economically feasible. Embodiments of the present invention are intended to overcome this problem.

Figure 2:
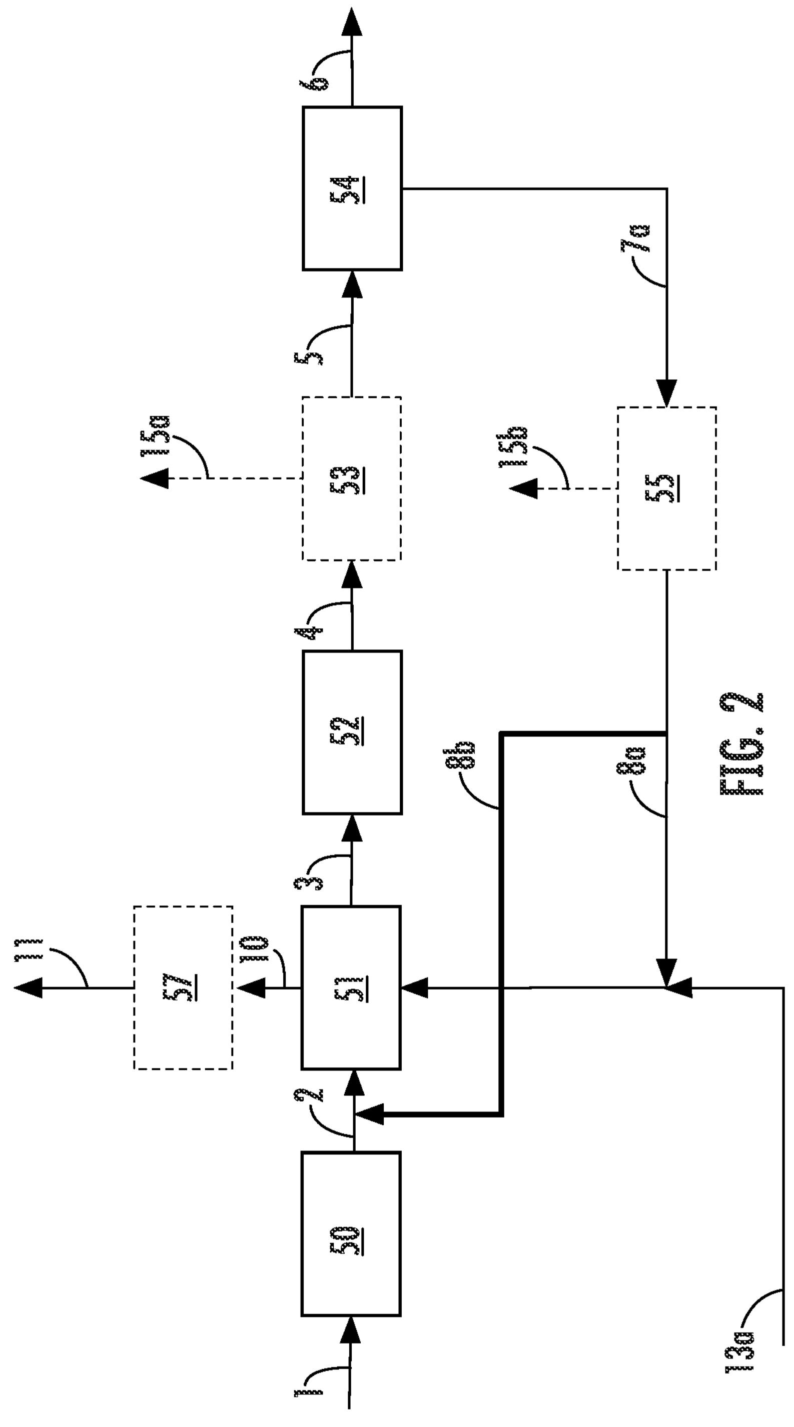
FIG. 2 shows an embodiment of a hydrogen production facility in accordance with an embodiment of the present invention.

As shown in FIG. 2, the claimed process includes a $CO_2$ capture unit 55 in the PSA offgas 7*a* or alternatively a syngas $CO_2$ capture unit 53. In order to avoid the costly flue gas $CO_2$ capture unit (56 from FIG. 1) the hydrocarbon make up fuel (9 from FIG. 1) is replaced with carbon-free ammonia fuel 13. In certain embodiments, at least a first portion of the PSA off gas 8*a* can be mixed with the ammonia fuel 13. However, because these off gases 8*a* contain carbon, in certain embodiments of the invention, a portion of the off gases 8*b* can be recycled and combined with preheated feed 2 for further reaction and recovery. In embodiments in which stream 8*a* is decreased or non-existent, the amount of ammonia fuel can be further increased. In another optional embodiment (not shown), at least a part of the PSA off gas 8*b* can be recycled to the hydrogen purification unit 54 to recover the $H_2$ contained in the off gas and to increase the overall $H_2$ product yield.

Flue gas (10), generated from combustion of $NH_3$ (13*a*) and, in certain embodiments, very small amount of offgasses 8*a*, contains significantly lower $CO_2$ (less than 5% as compared to flue gas (10) in FIG. 1). Therefore, embodiments of the invention allow for treatment of the flue gas 10 in a DeNOX unit 57 without further carbon capture units, such as required in prior art methods shown in FIG. 1.

Figure 3:
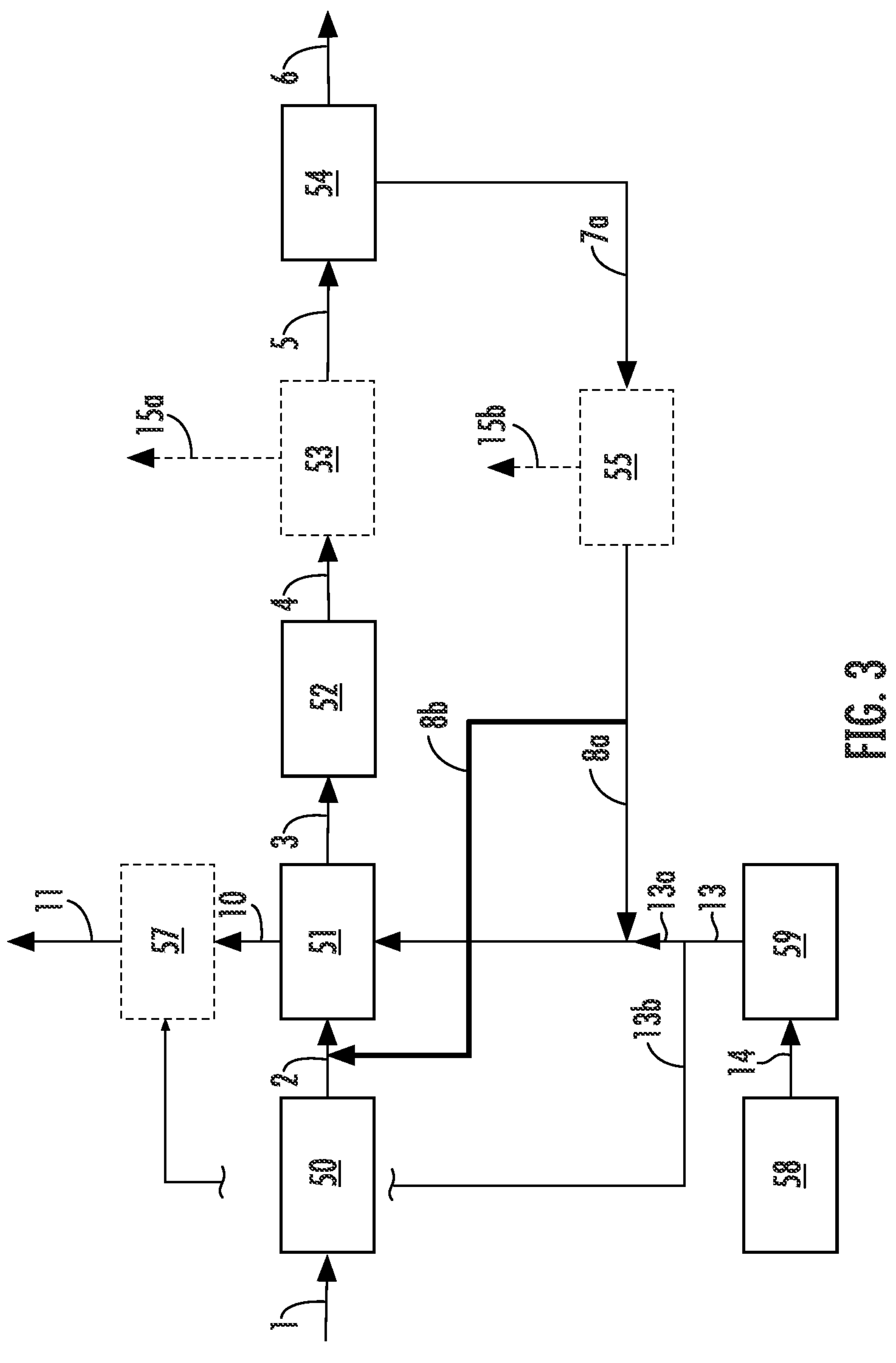
FIG. 3 shows an embodiment of a hydrogen production facility in accordance with an embodiment of the present invention.

The FIG. 3 illustrates an additional aspect of the invention. When combustion of pure ammonia fuel or in a mixture with hydrogen the formation of NOx is enhanced an additional measure for mitigation might be necessary. Modern SMR plant might have already a DeNOx unit installed where older plant might not have or might have only reserved provision for future revamp. In the DeNOx plant, ammonia is used as reactant for the reduction of NOx to $N_2$ and $H_2O$. Ammonia is a toxic and flammable substance and the storage requires various safety precautions and thus lead to additional handling cost. In order to lower the capital expenditure of the system a combined liquid ammonia storage (58) and vaporization system (59) is foreseen. Thus the amount of ammonia containing equipment and piping systems are reduced. The liquid ammonia (14) from storage vessel 58 is vaporized by the ammonia vaporization system (59). The gaseous ammonia is the used as steam reformer fuel 13*a* and as reactant 13*b* for the DeNOx unit.

Figure 4:
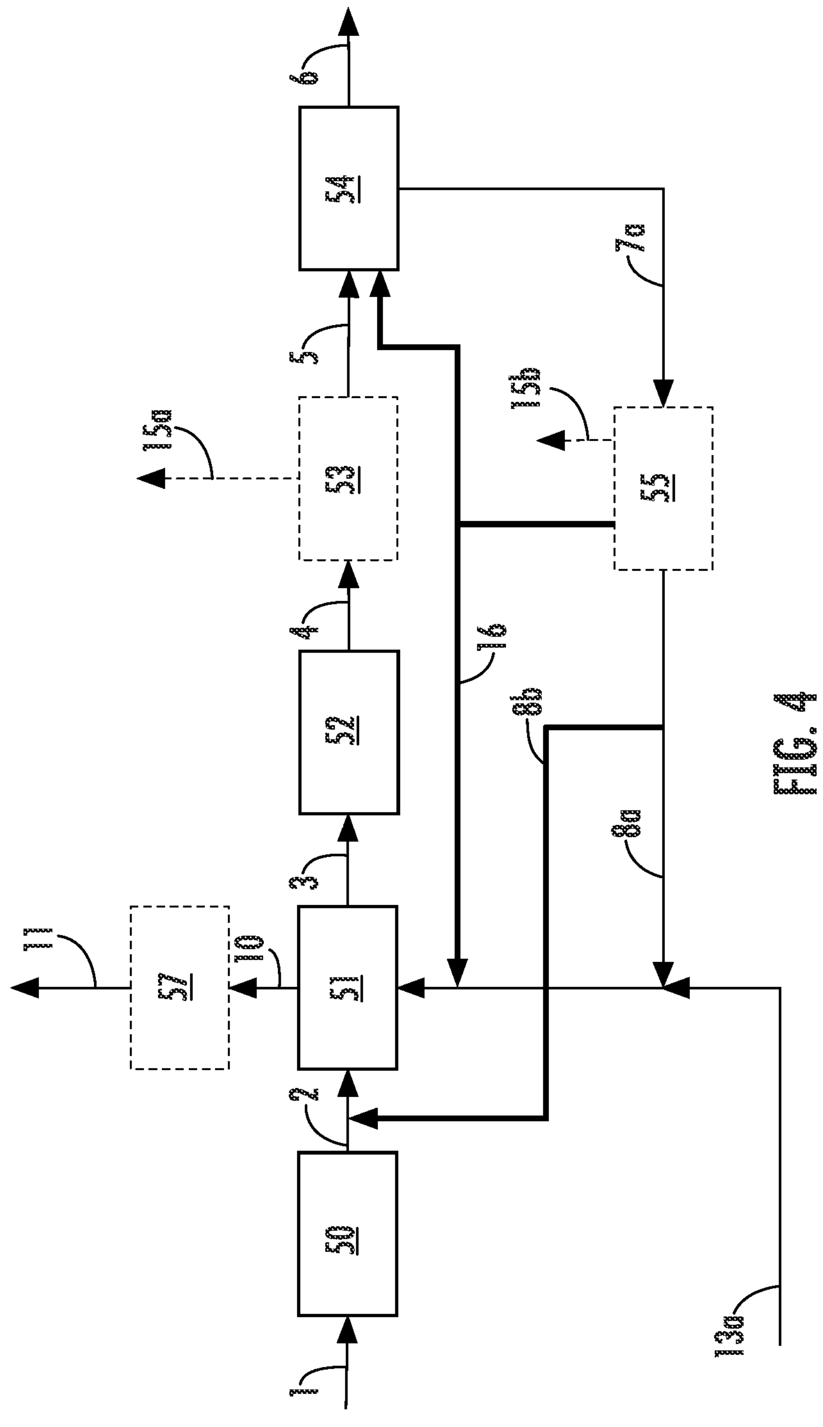
FIG. 4 shows an embodiment of a hydrogen production facility in accordance with an embodiment of the present invention.

FIG. 4 provides another embodiment of the present invention in which dedicated CO2 separation unit 55 is preferably a cryogenic type separation device that is configured to separate CO2 and hydrogen from the PSA off gas stream 7*a*. These units are well known in the art, and will not be discussed herein in any detail. This unit can produce carbon dioxide 15*b*, a hydrogen stream 16, and off gas 8. As before, off gas 8*a* can be used for fuel, and second off gas 8*b* can be recycled to a location upstream the SMR 51. In this embodiment, hydrogen stream 16 can be split, with one portion being used as fuel, which helps with flame stability, while the other portion can be recycled to the PSA for further refinement. In certain embodiments, flow off gas 8*a* can be reduced or even eliminated entirely if flow rate of hydrogen stream 16 is sufficient for combustion purposes. This advantageously further reduces CO2 in the resulting flue gas 10.

In certain embodiments, approximately 20% vol hydrogen can be added to the ammonia fuel in order to achieve more stable combustion behavior and minimize the NOx emissions. In the embodiment with a syngas amine unit, the PSA tail gas will contain enough hydrogen to allow for this preferable $NH_3+H_2$ gas mixture.

In an embodiment in which a syngas amine wash unit (no matter whether $CO_2$ capture for $H_2$ production or $CO_2$ removal because of a downstream coldbox for $H_2$ and CO production) is used, the trim fuel ratio can be higher, meaning the ratio of additional fuel versus waste fuel streams (PSA or CB offgas) is higher, and the effect of replacing natural gas with ammonia on the $CO_2$ emissions is relatively higher compared to low trim fuel ratio plant setups (w/o $CO_2$ removal). In optional embodiments, there can also be other parameters in plant design/operation that influence the trim fuel ratio—so in a revamp case the operating parameters of the SMR could be adjusted to maximize the ammonia as fuel.

In the embodiment having a Cryocap $H_2$, where the PSA tail gas is used as feed for the capture unit, the residue from the Cryocap (which contains some $H_2$ but also some $CH_4$, CO and $CO_2$) is recycled in majority to the SMR feed gas and preferably at more than 70% or 90%. Only a minority part is sent to fuel gas to ensure that there's no accumulation of inert gases ($N_2$, Ar, . . . ) in the flue gas. To obtain the required suitable fuel mixture for $NH_3$ combustion the amount of fuel gas from CryoCAP can be adjusted.

Alternatively, oxygen-enriched combustion air (23%) can be used to improve flame stability, increase the flame temperature and thus, the heat flux to the tubes.

In a further embodiment, preheating of ammonia at a temperature above 300° C. can be used to improve the flame stability, increase the reactiveness of the ammonia and decrease the amount of unburnt ammonia content in the flue gases as well as the amount of NOx in the flue gases.

As the NOx emissions are typically higher with ammonia fuel, a selective catalytic reduction ("SCR") unit can be installed to treat the high NOx levels. In an embodiment where an SCR unit is already existing, an upgrade might be necessary depending on the performance with higher NOx inlet conditions.

Furthermore, because of the slow kinetics of ammonia combustion, ammonia is expected to be present in a significantly high concentration in the flue gases. It is therefore possible to make use of the ammonia already existing in the flue gas to optimally reduce the NOx through the SCR, ideally without injecting additional ammonia. There exists several strategies to control the amount of ammonia in the flue gases. The first is to play on the overall combustion air ratio, by either acting on the air flow rate, and/or on the fuel flow rate. Second, preheating ammonia can result in the control of its combustion kinetics and thus, can be considered as an effective way to control its content in the flue gases. Third, adding hydrogen in the fuel makes it possible to further control the flue gases composition. Last, preheating oxidizer temperature can be used to control the overall kinetics of the flame and thus, the amount of residual ammonia in the flue gases.

In an embodiment where no SCR/SNCR unit is already existing, the previous ammonia control strategies could also be implemented. This way, the furnace could get the SNCR function, without installing new equipment.

Operational Flexibility:

It is projected that the SMR can operate in two modes: Conventional mode (with natural gas plus PSA tail gas (or residue from cryocap)) and $NH_3/H_2$ off gas mode (no Natural gas injection). The first mode may be used for the first years of operation of the plant, and the second mode later on when $CO_2$ emissions must be further reduced. In this case, burners and fuel system are designed accordingly.

Table I and Table II below show comparative data that compares an embodiment of the prior art (using NG as fuel) with results in which the fuel is at least partially replaced with ammonia (stream 13*a*) (i.e., 85% ammonia or 100% ammonia). As can be seen, there is a significant reduction in carbon dioxide emission.

TABLE I

Comparison of Prior Art with Embodiments of the Invention

| Case A | | Base case | Trim fuel replacement 85% | Trim fuel replacement 100% |
|---|---|---|---|---|
| Hydrogen production | Nm3/hr | 167343 | 167343 | 167343 |
| CO2 emission | kg/hr | 55594 | 27338 | 22351 |
| CO2 emission | kg CO2/kg H2 | 3.69 | 1.81 | 1.48 |
| % reduction in CO2 emission | % | — | 50.8% | 59.8% |

TABLE II

Another Comparison of Prior Art with Embodiments of the Invention

| Case B | | Base case | Trim fuel replacement 100% |
|---|---|---|---|
| Hydrogen production | Nm3/hr | 25100 | 25100 |
| CO2 emission | kg/hr | 16086 | 8904 |
| CO2 emission | kg CO2/kg H2 | 7.11 | 3.94 |
| % reduction in CO2 emission | % | — | 44.6% |

As used herein, stable combustion behavior can be determined by measuring an extinction stretch rate of the flame produced by certain embodiments of the invention. In certain instances, combustion can be considered stable as long as the extinction stretch rate of a flame produced according to certain embodiments of the present invention is within 15%, preferably within 10%, more preferably within 5% of the extinction stretch rate of a flame produced using methane, off-gasses and air. While the invention has be described primarily in accordance with a steam methane reforming production unit, the invention can be equally applied to other hydrogen production facilities such as, but not limited to, autothermal reforming. In essence, embodiments of the invention include the combination of reducing $CO_2$ in the flue gas by using a fuel gas comprised of ammonia, as well as carbon capture on the resulting process streams (i.e., streams that result from the conversion of the feed stream to hydrogen).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps or devices can be combined into a single step/device.

The singular forms "a", "an", and "the" include plural referents, unless the context clearly dictates otherwise. The terms about/approximately a particular value include that particular value plus or minus 10%, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. An apparatus for producing hydrogen in a steam methane reformer with reduced carbon emissions, the apparatus comprising:

a first heat exchanger configured to heat a feed stream comprising methane to produce a heated feed stream that is at a temperature above 500° C.;

a reaction zone in fluid communication with the first heat exchanger, wherein the reaction zone is configured to receive the heated feed stream under conditions effective for catalytically cracking the heated feed stream and catalytically crack the heated feed stream to produce a reformed stream, wherein the reformed stream comprises hydrogen, carbon monoxide, and unreacted methane;

a shift conversion unit in fluid communication with the reaction zone, wherein the shift conversion unit is configured to receive the reformed stream in the presence of steam and produce a shifted gas stream comprising hydrogen and carbon dioxide; and a hydrogen purification unit configured to receive the shifted gas stream and purify the shifted gas stream to produce a hydrogen product stream and a tail gas;

an ammonia source;

wherein the conditions effective for catalytically cracking the heated feed stream comprise providing heat to the reaction zone via combustion of a fuel and a hydrogen fuel stream in presence of an oxidizer, wherein the fuel comprises ammonia from the ammonia source, wherein a flue gas is produced by the combustion of the fuel and the hydrogen fuel stream.

2. The apparatus as claimed in claim 1, further comprising means for adjusting flow rates of the hydrogen fuel stream and the fuel, such that the means for adjusting flow rates is configured to cause the hydrogen fuel stream and the fuel to have a combined molar flow rate, wherein a molar flow rate of the hydrogen to the combined molar flow rate is between 0.2 and 0.35.

3. The apparatus as claimed in claim 1, further comprising a carbon dioxide removal unit that is configured to remove carbon dioxide from a stream selected from the group consisting of a first stream, a second stream, and combinations thereof, wherein the first stream is the shifted gas stream prior to purification, wherein the second stream is the tail gas.

4. The apparatus as claimed in claim 1, wherein the hydrogen fuel stream comprises at least a first portion of the tail gas.

5. The apparatus as claimed in claim 1, wherein the fuel and the hydrogen fuel stream are fed to a common burner system.

6. The apparatus as claimed in claim 1, wherein the fuel and the hydrogen fuel stream are fed to separate burner systems.

7. The apparatus as claimed in claim 1, further comprising an ammonia vaporizer configured to vaporize liquid ammonia to produce gaseous ammonia, wherein ammonia in the fuel comprises the gaseous ammonia from the ammonia vaporizer.

8. The apparatus as claimed in claim 1, further comprising a NOx removal unit that is configured to remove NOx from the flue gas using a selective catalytic reduction unit.

9. An apparatus for producing hydrogen in a steam methane reformer with reduced carbon emissions, the apparatus comprising a first heat exchanger, a reaction zone, a shift conversion unit, a hydrogen purification unit, and a $CO_2$ removal unit, the apparatus being configured to operate in a first mode of operation and a second mode of operation, wherein during both modes of operation, the apparatus is configured to:

a) heat a feed stream comprising methane in the first heat exchanger to produce a heated feed stream, wherein the heated feed stream is at a temperature above 500° C.;

b) introduce the heated feed stream into the reaction zone under conditions effective for catalytically cracking the heated feed stream to produce reformed stream, wherein the reformed stream comprises hydrogen, carbon monoxide, and unreacted methane;

c) introducing the reformed stream in the presence of steam to the shift conversion unit that is configured to produce a shifted gas stream comprising hydrogen and carbon dioxide;

d) purifying the shifted gas stream in the hydrogen purification unit to produce a hydrogen product stream and a tail gas; and e) removing carbon dioxide, using the $CO_2$ removal unit, from a stream selected from the group consisting of a first stream, a second stream, and combinations thereof, wherein the first stream is the shifted gas stream, wherein the second stream is the tail gas, wherein the conditions effective for catalytically cracking the heated feed stream comprise providing heat to the reaction zone via combustion of a fuel and a hydrogen fuel stream in the presence of an oxidizer, wherein the hydrogen fuel stream comprises at least a first portion of the tail gas, wherein a flue gas is produced by the combustion of the fuel and the hydrogen fuel stream, wherein during the first mode of operation, the fuel comprises a hydrocarbon, wherein during the second mode of operation, the apparatus is in fluid communication with an ammonia source such that the fuel comprises ammonia, wherein the flue gas produced by the second mode of operation comprises less carbon dioxide than the flue gas produced by the first mode of operation.

10. The apparatus as claimed in claim 1, further comprising: means for determining an extinction stretch rate of a flame produced by the combustion of the fuel and the hydrogen fuel stream; and means for adjusting a molar flow rate of the hydrogen fuel stream relative to the fuel on the basis of the determined extinction stretch rate to maintain stable combustion behavior.

11. The apparatus as claimed in claim 10, wherein the means for adjusting the molar flow rate of the hydrogen fuel stream is configured to maintain the extinction stretch rate of the flame within 15% of an extinction stretch rate of a flame produced using a mixture of methane and air.

* * * * *